United States Patent [19]
Wardrop

[11] 3,945,010
[45] Mar. 16, 1976

[54] PULSE COMPRESSION RADAR
[75] Inventor: Brian Wardrop, Worcester, England
[73] Assignee: The Marconi Company Limited, Chelmsford, England
[22] Filed: Aug. 9, 1974
[21] Appl. No.: 496,271

[52] U.S. Cl. .......................................... 343/17.2 PC
[51] Int. Cl.² .......................................... G01S 9/233
[58] Field of Search ............................. 343/17.2 PC

[56] References Cited
UNITED STATES PATENTS
3,731,311  5/1973  Williams ..................... 343/17.2 PC

*Primary Examiner*—T. H. Tubbesing
*Attorney, Agent, or Firm*—Baldwin, Wight & Brown

[57] ABSTRACT

The invention is concerned with a bi-phase decoder in which compensation is provided for Doppler shift.

In the phase decoder of the invention, the signs and magnitudes of the components of the received signals in the in-phase and quadrature axes are determined and errors caused by Doppler shift are detected by detecting changes in the product of the signs of the two components at times when the magnitude of a predetermined one of the components exceeds that of the other.

1 Claim, 8 Drawing Figures

PULSE COMPRESSION RADAR

This invention relates generally to pulse compression and is particularly concerned with avoiding problems caused by Doppler shift in surveillance radar using bi-phase codes as a means of pulse compression.

Two priorities of importance in any surveillance radar are target detectability and resolution. The capability of a radar to detect a small or remote target is limited mainly by the mean transmitted power. The resolution of a radar is determined by the bandwidth of the transmitted waveform assuming that a suitable receiver is used.

The nature of the invention will be more clearly understood by reference to the accompanying drawings, of which FIGS. 1a–1c depict the pattern of phase reversal within a transmitted pulse and the autocorrelation function of the pulse;

Figure 1A:
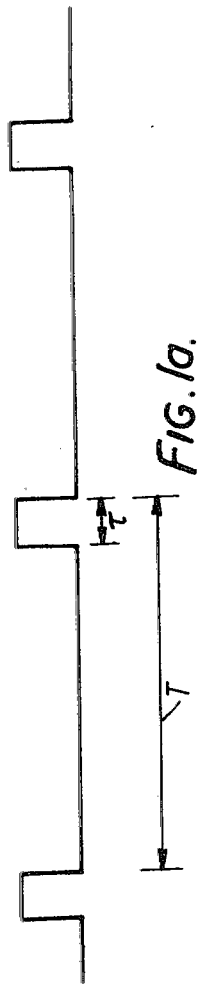

In a conventional radar, the transmitted waveform is a train of pulses as shown in FIG. 1a of the accompanying drawings. The mean power is determined by the peak power and the duty ratio, that is to say the ratio of the width $\tau$ of the pulses to the overall repetition period T. T is fixed by the maximum unambiguous range, and $\tau$ by the resolution required. Thus, to improve the detectability of the radar only the peak power can be increased and this is limited by the components used. There is therefore a conflict of interests if both improved detectability and resolution are required.

It is now recognised that the resolution is not governed by the pulse length but, as previously stated, by the overall transmitted bandwidth. Thus, by modulating the carrier within the transmitted pulse length the bandwidth is increased and the resolution improved with no reduction in mean transmitted power.

One known form of modulation to effect pulse compression is phase modulation in which within the width of the transmitted pulse the phase is reversed at specified intervals or sub-pulses. Whilst these phase reversals can follow a random sequence, by using certain well-defined sequences known as "Barker codes" it is possible to reduce the level of the sidelobes after processing of the received pulse.

Figure 1B:
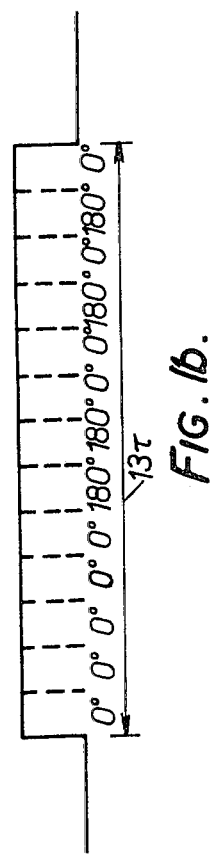
Figure 1C:
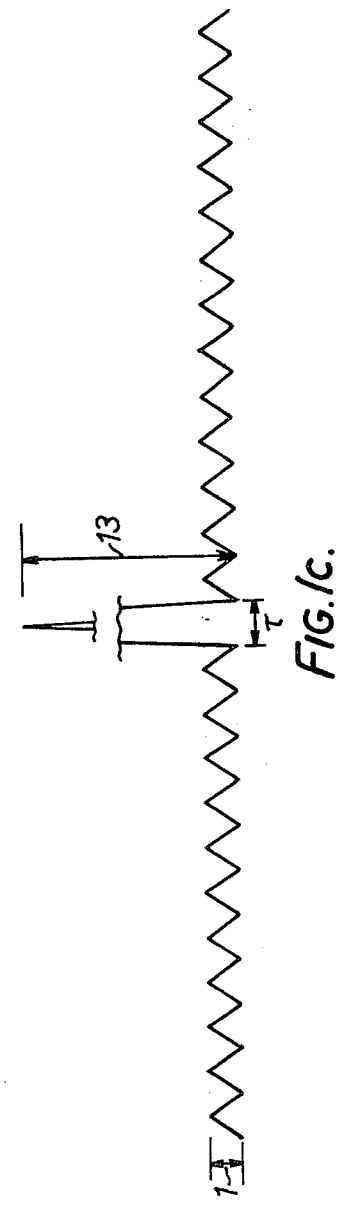

In FIG. 1b of the accompanying drawings there is shown the pattern of phase reversal within a pulse sub-divided into thirteen sub-pulses, so forming a Barker code. The auto-correlation function of this pulse is shown in FIG. 1c. This graph shows the level of correlation of a pulse as in FIG. 1b with a similar pulse when plotted against the relative time of the pulses being completed. It will be seen that except at coincidence in time the correlation function takes on values between 0 and 1 and that when the two signals are coincident the correlation function has a value of 13. This means that though the transmitted pulse has an overall duration of 13 $\tau$ the resolution of the radar is 1 $\tau$ and there is a difference of 22.3 dB between the level of the sidelobes and the correlation peak, although with digital filtering this may be improved to 34 dB.

Figure 2:
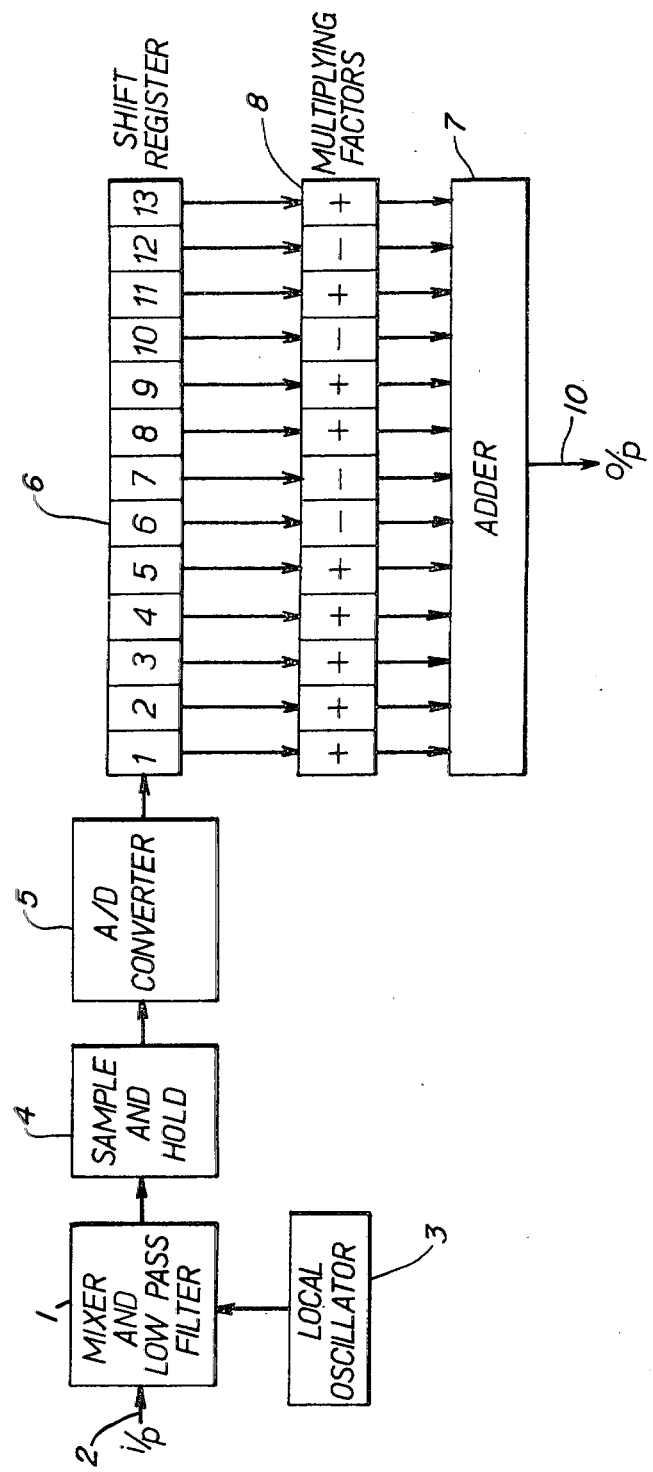
FIG. 2 shows diagrammatically a simple form of Barker decoder connected to an autocorrelator.

A simple form of Barker decoder is shown diagrammatically in FIG. 2 of the accompanying drawings. Here the input signal is fed into a phase shift detector 1 which compares the phase of the input signal 2 with that from a local oscillator 3. A sample-and-hold circuit 4 periodically samples the output of the mixer at periods equal to one sub-pulse and digital code representative of the sampled voltage is fed by an analogue-to-digital converter 5 into a thirteen-element shift register 6. Each stage in the shift register is separately sampled and fed into an adder 7, correlation being effected by first multiplying the signal derived from each stage of the shift register by a preselected multiplying factor of +1 or −1 (symbolized by block 8), the sequence of multiplying factors corresponding to the sequence of phase reversal in the transmitted pulse. The sum signal 10 at the output of the adder 7 corresponds to the autocorrelation function of the received signal and if an ideal signal is received (corresponding to the signal in FIG. 1b the output will correspond to FIG. 1c, the correlation peak being obtained when the digital codes derived from all thirteen sub-pulses fully occupy the shift register 6.

Figure 3:
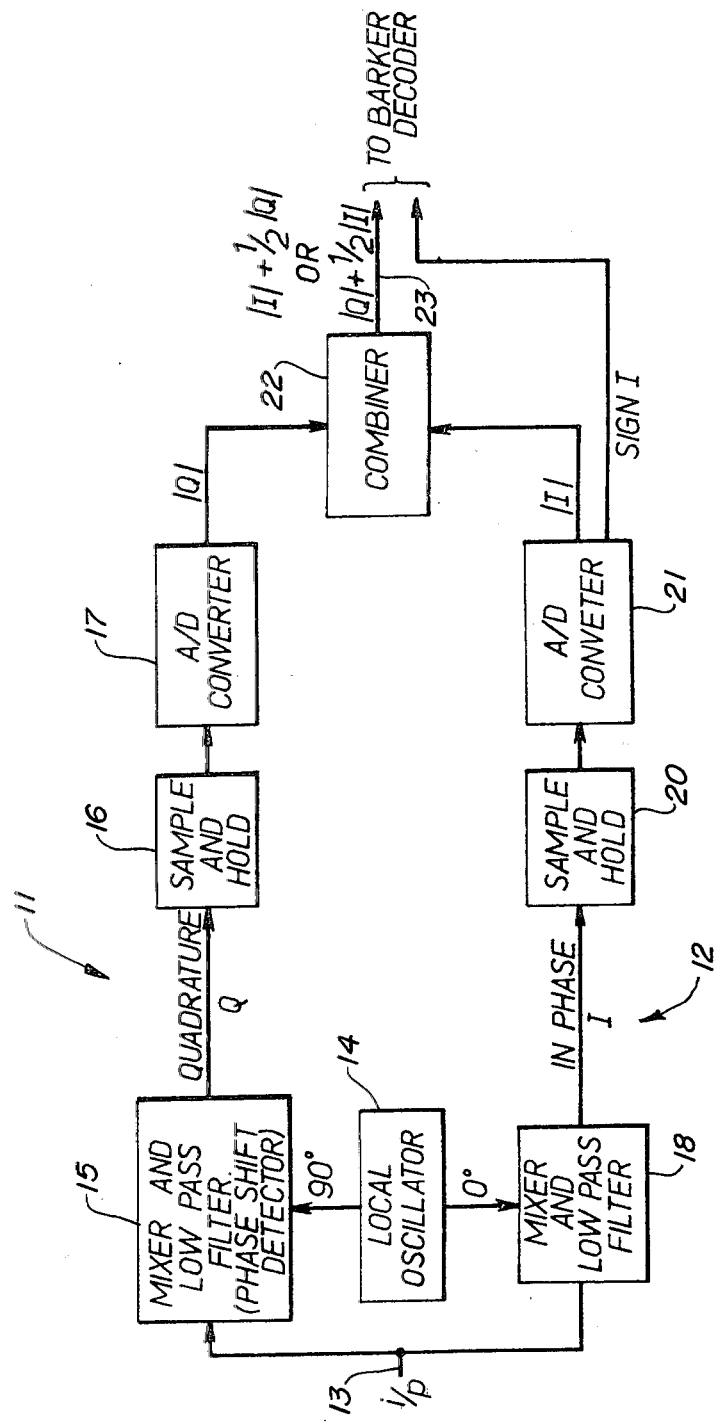
FIG. 3 shows diagrammatically a quadrature system for use in a bi-phase decoder.

The embodiment of FIG. 2 only produces the autocorrelation function of FIG. 1c when the phase of the local oscillator 3 is correctly matched to the input signal 2, that is to say when the phase shift detector 1 only receives signals which are either completely in-phase or completely out-of-phase. In practice, the phase of the received signal will vary and on average the system will suffer a 3dB loss. In order to overcome this problem it is known to use a quadrature system as shown in FIG. 3 of the accompanying drawings. In this system two channels 11 and 12 are used for processing an input signal 13 which channels are in-phase and quadrature channels. The system relies on the fact that when the in-phase signal is 90° out-of-phase with the local oscillator 14 the quadrature channel 11, represented by a phase-shift detector 15 connected to a sample-and-hold circuit 16 which is, in turn, connected to an analog-to-digital converter 17, will produce its maximum output. Thus, by suitable combination of the output signals to the two channels that is to say, the output of quadrature channel 11 with the output of the in-phase channel 12, represented by a phase-shift detector 18 connected to a sample-and-hold circuit 20 which is, in turn, connected to an analog-to-digital converter 21, the signal level at the output may be made substantially independent of the phase of the input signal 13.

A combiner 22 combines the outputs of the in-phase channel 12 and the quadrature channel 11 and produces a signal 23 whose magnitude is the greater of $|I|+\frac{1}{2}|Q|$ and $|Q|+\frac{1}{2}|I|$. A signal of this magnitude and of sign determined in the in-phase channel 12 is fed into a 13-element shift register 6 as shown in FIG. 2 and the parallel outputs of the shift register, after being suitably multiplied and added, produce a correlation function more closely resembling that of FIG. 1c.

A problem which is still encountered with the system in FIG. 3 is brought about by any Doppler shift in frequency of the input signal 13 causing its frequency to depart from that of the local oscillator 14. As analysis of the decoder performance with Doppler shift is tedious to compute, a system as shown in FIG. 3 was simulated on a digital computer. For a sub-pulse duration of 3.6µS and a first pulse phase of 0° Table 1 shows the results which were obtained for the system with a 13-element code.

| Doppler Frequency (Hz) | Main Lobe Amplitude (dB) | Maximum sidelobe Level (dB) |
|---|---|---|
| 0 | 0 | −33 |
| 900 | +0.12 | −33 |
| 1800 | +0.36 | −32 |
| 2700 | +0.44 | −32 |
| 3600 | +0.48 | −31 |
| 7200 | −4.4 | −6 |

It can be seen that up to a Doppler frequency of 3600 Hz there is 31.48 dB difference between the main lobe amplitude and the level of the maximum sidelobe but that at a Doppler frequency of 7200 Hz there is a very severe degradation in the sidelobe ratio. The reason for this is that at a frequency of 7200 though the first sub-pulse has zero phase with reference to the local oscillator because of the gradual change in phase due to the frequency difference along the length of the whole pulse the quadrature axis will be crossed and as a result the last few sub-pulses will be allocated the wrong sign.

For a Doppler frequency $f_d$ and a sub-pulse length of $t_p$ the number of radians moved during the thirteen samples is $12 \times 2 f_d t_p$. To a first approximation, one can say that the sidelobe performance degrades sharply once the quadrature axis is passed and this leads to two zones of unacceptably high sidelobes which straddle, respectively, the positive and the negative quadrature axes. The zones in which the sidelobe levels are acceptable are $2\pi - (4 \times 12 \times 2\pi f_d t_p)$ radians and the percentage of time when the good sidelobe level is obtained is $100 (1 - 48 f_d t_p)\%$. As an example, if no sidelobe degradation is required for 80% of the time and $t_p = 3.6\mu S$ then the maximum allowable Doppler is only 1.1 kHz or 370 m.p.h. at L-Band. The present invention seeks to provide an improved system capable of compensating for incorrect allocation of sign to the elements of the bi-phase codes due to Doppler frequency shift in a signal reflected by a single target.

In accordance with the present invention, a bi-phase decoder includes two phase-shift detectors each operative to measure the phase difference between each sub-pulse in a received bi-phase code relative to a respective one of two signals in phase quadrature with one another; two sampling circuits each operative to sample periodically the output of a respective one of the phase-shift detectors and to produce a first signal representative of the magnitude of the sampled output and a further signal representative of the sign of the sampled output; a combiner for combining the magnitude signals generated by the sampling circuit in such a manner as to render the sensitivity of the decoder substantially independent of the phase of the received code and an autocorrelator connected to receive the output signal of the combiner and the sign signal from one of the sampling circuits and to autocorrelate the signal from successive sub-pulses to effect pulse compression; the decoder further includes corrector means for correcting errors in the sign signal derived from one of the sampling circuits resulting from Doppler shifting of the carrier frequency of the received bi-phase code, the corrector means being operative to detect such errors by detecting changes in the product of the sign signals derived from the separate sampling circuits at times when the value of the magnitude signal derived from a predetermined one of the sampling circuits is greater than the value of the magnitude signal derived from the other.

The invention will now be described fruther, by way of example, with reference to FIGS. 4, 5 and 6 of the accompanying drawings.

Figure 4:
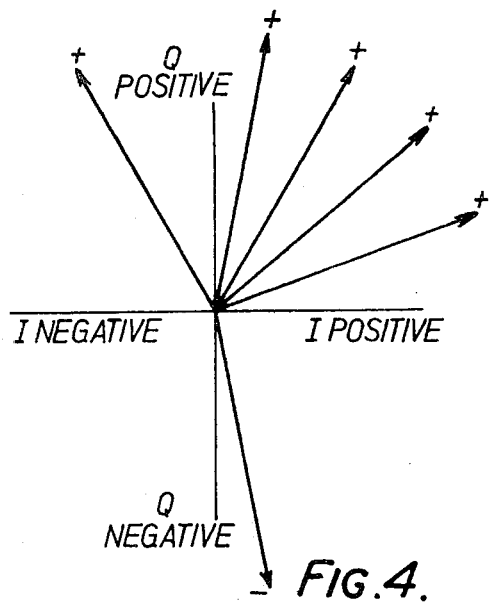
FIG. 4 shows a vector diagram demonstrating a doppler shift.

In FIG. 4, the angles which each line subtends with the in-phase axis I and the quadrature axis Q represents the phase of the received signal at any instant in time relative to the local oscillators in the in-phase and quadrature channels, respectively. If there is no Doppler shift, then the vector will always point in the same direction but will take on either positive or negative values depending on whether the sub-pulse is in-phase or out of phase with the appropriate local oscillator. If, however, there is a change in frequency owing to the Doppler effect, then the received signal will have a different frequency from the local oscillator and this results in the phase of the received signal continuously changing. Thus, instead of the vector remaining stationary it rotates counter clockwise with an angular velocity dependent upon the Doppler shift and the various vectors shown in FIG. 4 represent the instantaneous values in consecutive sub-pulses. The vector with a minus sign in FIG. 4 is one which is phase inverted relative to the other four vectors shown in the drawing.

In the arrangement of FIG. 3, the magnitude of the signals sent to the bi-phase decoder is derived both from the in-phase channel 12 and the quadrature channel 11 and is substantially constant and independent of phase. However, the sign of the signal sent to the bi-phase decoder is derived solely from the in-phase channel 12. This means, in the case of the phase vectors following the course shown in FIG. 4, the first four samples will be allocated a positive sign which coincides with the phase of received signal so that until then there is no error. However, in the fifth sub-pulse, again a positive sign will be allocated to the sub-pulse despite the fact that a negative sign should have been allocated. The reason for this may clearly be seen from the vector diagram namely the vectors have crossed the quadrature axis in the course of their rotation caused by Doppler shift.

A crossing of the quadrature axis may be detected by the fact that the product sign Q × sign I changes sign. This will occur both when the quadrature axis and when the in-phase axis is crossed. Of all the crossings of the axes, only crossings of the quadrature axis are of importance since crossings of the in-phase axis do not effect the sign of the signal derived from the in-phase channel. It is therefore necessary to test, having determined a change in the product sign Q × sign I whether this is caused by a crossing of the quadrature axis or a crossing of the in-phase axis.

In a radar operating at the frequency of 3 GHz a target radial velocity of 3000 m.p.h. results in a Doppler shift of 27 kHz. If the sub-pulse interval is 3.6µS the angle of rotation between the sub-pulse is only 35°. Thus, after crossing of the quadrature axis the vector will be no more than 35° away from the quadrature axis and as a result the value of $|Q|$ must be greater than the value of $|I|$. This can thus be used as a test to determine which axis has been crossed.

Figure 5:
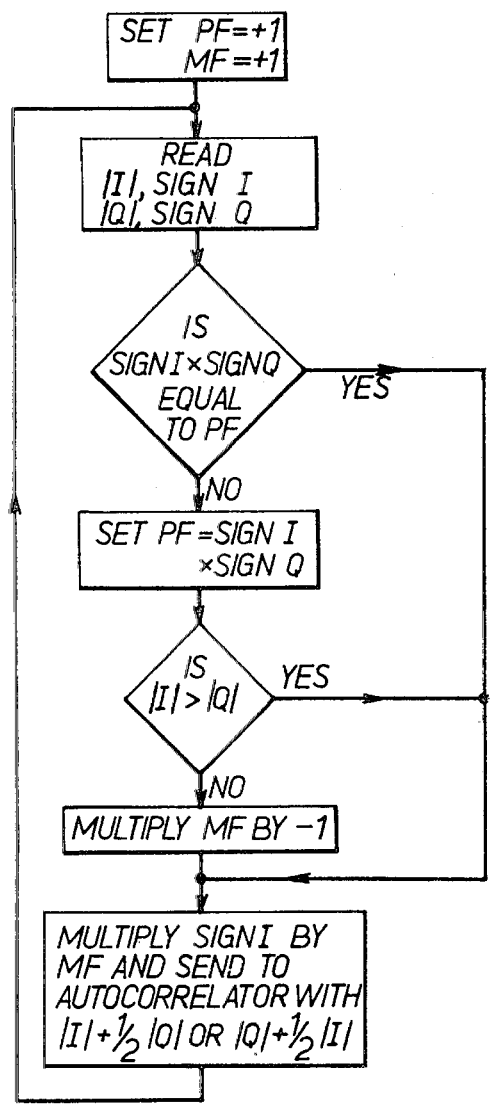
FIG. 5 is a flow chart of the logical steps according to the invention.

Referring now to the flow chart on FIG. 5, this starts by defining a quantity PF which is the product of sign I and sign Q. This product is positive in the first quadrant, negative in the second quadrant, positive in the third quadrant and negative in the fourth quadrant. It is arbitrarily set to positive at the start. There is also defined a multiplying factor MF and this can take on values either of +1 or −1. During all the times that the vectors of FIG. 4 are to the right of the quadrature axis the multiplying factor is positive and during all the time that it is to the left of the quadrature axis the multiplying factor is negative.

Having allocated arbitrary magnitude to the quantities PF and MF, the values of $|I|$, $|Q|$, sign I and sign Q are read from the in-phase and the quadrature channels of the arrangement of FIG. 3. It is now necessary to determine whether there has been a change in quadrant that is to say whether sign I × sign Q differs from the existing value of PF. If it is the same then the quadrant has not changed and the next three steps in flow chart are by-passed and the value of sign I is multiplied by the existing value of MF and fed to the bi-phase decoder.

If there has been a change then the stored value of PF is changed to the new value and one determines whether the in-phase axis or the quadrature axis has been crossed by comparing the magnitudes of $|I|$ and $|Q|$. If $|I|$ is greater than $|Q|$ then it is the in-phase axis which has been crossed and this does not necessitate a change in the magnitude of the multiplying factor and the next step in the flow chart is by-passed in the same manner as previously. If, however, $|Q|$ is greater than $|I|$ this indicates that the quadrature axis has been crossed and before multiplying sign I by MF the latter is itself changed in sign.

Figure 6:
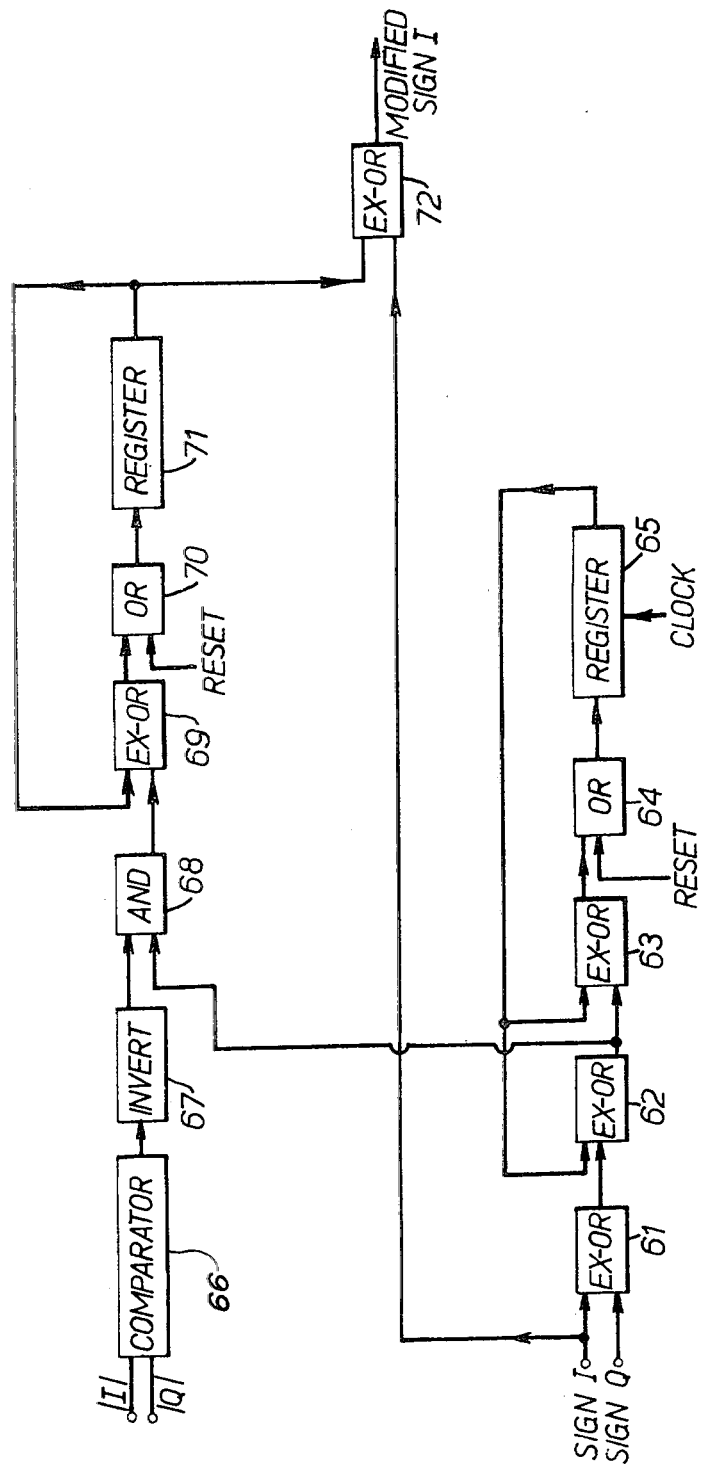
FIG. 6 is a block circuit diagram of an arrangement for implementing the logic described in FIG. 5.

The circuit arrangement in FIG. 6 implements the flow chart of FIG. 5 and includes two registers 71 and 65 which store the values of MF and PF respectively. An exclusive-OR gate which includes an inverter is designated 61 in the drawing and receives signals representative of sign I and sign Q. The output of the exclusive-OR gate 61 is high when sign I is the same as sign Q and low when sign I is different from sign Q. If one takes positive as being high and negative as being low then the output of the exclusive-OR gate 61 is representative of sign I × sign Q. This value is compared in a second exclusive-OR gate 62 with the value of PF stored in the register 65 so that his output would be high whenever there is a change in PF. The next step in the flow chart is to set PF to the new value and this is done by feeding the output of the register 65 and of the exclusive-OR gate 62 and the third exclusive-OR gate 63 whose output is fed by way of an OR gate 64 into the clocked register 65. The OR gate 64 is provided to enable resetting of the register 65 and commencement of operation and likewise an OR gate 70 is provided for enabling resetting of the register 71 which stores the value of MF.

Before the value of MF is changed not only must there be a high level produced at the output of the exclusive-OR gate 62 but $|Q|$ must be greater than $|I|$. Thus, $|Q|$ and $|I|$ are compared in a comparator 66 whose output is fed by way of an inverter 67 into an AND gate 68 the other input of which is also connected to the output of the exclusive-OR gate 62. Whenever a high level appears at the output of AND gate 68 it indicates that a crossing of the quadrature axis has occurred so that the value of MF must be changed. This is effected by feeding the value of MF derived from the register 71 and the output of the AND gate 68 into an exclusive-OR gate 69 whose output is fed by way of the OR gate 70 into the register 71. The multiplying factor derived from the register 71 is fed to a final exclusive-OR gate 72 which is also connected to the signal sign I and which serves to invert the signal whenever the phase sector lies to the left of the quadrature in FIG. 4.

I claim:

1. A bi-phase decoder comprising two phase-shift detectors each operative to measure the phase difference between each sub-pulse in a received bi-phase code relative to a respective one of two signals in phase quadrature with one another; two sampling circuits each operative to sample periodically the output of a respective one of the phase-shift detectors and to produce a first signal representative of the magnitude of the sampled output and a further signal representative of the sign of the sampled output; a combiner for combining the magnitude signals generated by the sampling circuit in such a manner as to render the sensitivity of the decoder substantially independent of the phase of the received code and an autocorrelator connected to receive the output signal of the combiner and the sign signal from one of the sampling circuits and to autocorrelate the signal from successive sub-pulses to effect pulse compression; the decoder further including signal modifying means for correcting errors in the sign signal derived from one of the sampling circuits resulting from Doppler shifting of the carrier frequency of the received bi-phase code, the signal modifying means being operative to detect such errors by detecting changes in the product of the sign signals derived from the separate sampling circuits at times when the value of the magnitude signal derived from a predetermined one of the sampling circuits is greater than the value of the magnitude signal derived from the other.

* * * * *

UNITED STATES PATENT AND TRADEMARK OFFICE
CERTIFICATE OF CORRECTION

PATENT NO. : 3,945,010
DATED : March 16, 1976
INVENTOR(S) : Brian Wardrop

It is certified that error appears in the above-identified patent and that said Letters Patent are hereby corrected as shown below:

In the patent heading, after Item [21], insert:

[30]  Foreign Application Priority Data

Aug. 10, 1973    Great Britain    37935/73

Signed and Sealed this eighteenth Day of May 1976

[SEAL]

Attest:

RUTH C. MASON
Attesting Officer

C. MARSHALL DANN
Commissioner of Patents and Trademarks